United States Patent Office
3,328,395
Patented June 27, 1967

3,328,395
6-HALO-2-AMINO SUBSTITUTED-4-SULFANIL-
AMIDO-PYRIMIDINE COMPOUNDS
Yoshihiro Nitta, Tokyo, Kiyoshi Okui, Ibaragi-ken, and
Kiyohiko Ito, Tokyo, Japan, assignors to Chugai Seiya-
ku Kabushiki Kaisha, Tokyo, Japan, a corporation of
Japan
No Drawing. Filed Dec. 24, 1963, Ser. No. 333,170
Claims priority, application Japan, Dec. 29, 1962,
37/59,471
6 Claims. (Cl. 260—239.75)

The present invention relates to novel 4-sulfanilamido-pyrimidines (1) having substituted amino radical in the pyrimidine nucleus represented by the following general formula:

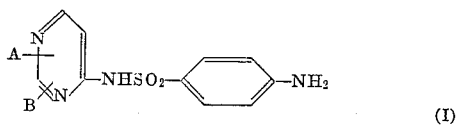

wherein A and B are respectively atoms or radicals combined at 2 position and 6 position, one of them represents always

and another hydrogen, halogen, alkoxy, alkylthio or

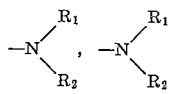

being such a radical that $R_1$ and $R_2$ are aliphatic hydrocarbon residue or that forms a heterocyclic ring containing or not containing oxygen or sulfur atom in addition to $R_1$, $R_2$ and adjacent nitrogen atom, and their salts.

The present invention relates also to the processes for manufacturing novel 4-sulfanilamido-pyrimidines having substituted amino radical in the pyrimidine nucleus represented by aforementioned general Formula I and their salts.

The essential feature of the present invention resides in the process which comprises condensing the compounds (II) represented by the general formula:

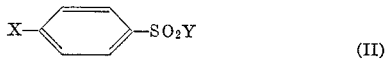

wherein X is an amino radical or substituent capable of being converted into amino radical, for example, nitro, acylamido, alkoxycarboxylamido, azo radical and the like and Y is halogen, amino radical or detachable residue which is necessary to form an imino radical (—NH—), with the compounds (III) represented by the general formula:

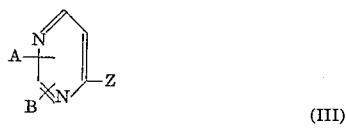

wherein A and B are the same groups as above and Z is the same with Y but the reaction is not effected on the same radicals of Z and Y, in case X in the reaction products obtained being the radical capable of being converted into amino radical if being converted into amino radical.

According to the present invention, in case a compound (II) Y in which is halogen, especially chlorine, that is to say, benzenesulfonylchloride having at p-position a substitutent capable of being converted into amino radical by hydrolysis or reduction is caused to react with a compound Z in which is amino radical, that is to say, 4-aminopyrimidine derivative it is preferable to use a solvent, for example, pyridine and to perform the reaction at room temperature. Then the reaction product is subjected to hydrolysis or reduction to convert the substituent at p-position into amino radical, whereupon the desired compound (I) may be obtained. In case the hydrolysis is performed with caustic potash or caustic soda, the dissolution of the reaction product is so difficult that the decomposition reaction does not proceed smoothly owing to the influence of a substituted amino radical in pyrimidine nucleus. In this case, the reaction may be accelerated by addition of a lower alcohol such as, for example, methanol, ethanol and the like.

A compound (II) Y in which is an amino radical may be reacted with a compound (III) Z in which is, for example, halogen or trimethyl ammonium chloride group by known procedure. In this case, if the reaction product having sulfanilamido group (—SO₂—NH—) formed has X as a substituent capable of being converted into amino radical, the transformation of the X into amino radical may be carried out by hydrolysis or reduction.

According to the present invention, the novel 4-sulfanilamido-pyrimidine derivatives may be caused to react, by known procedure, with for example alkaline substance, alkali carbonate, alkali hydroxide or organic base to give their salts.

The novel products of the present invention are useful particularly in the therapy of bacterial infection as so-called sulfa drugs.

The present invention will be illustrated by the following examples and is not intended to limit the invention.

EXAMPLE 1

2-methoxy-6-dimethylamino-4-sulfanilamido-pyrimidine 1.68 g. (0.01 mol) of 2-methoxy-6-dimethylamino-4-amino-pyrimidine and 2.34 g. (0.01 mol) of p-acetamido-benzenesulfoxylchloride were dissolved in 2.3 cc. of anhydrous pyridine and the solution kept to stand for one night at room temperature. Thereafter 100 cc. of water were added to the solution and then the product deposited was separated and dried. It was dissolved in methanol under heating and treated with activated carbon. On the concentration of the solution to one third of its volume and leaving to stand white needle crystals of 2-methoxy-6-dimethylamino-4-acetylsulfanilamido - pyrimidine were obtained. Said crystals were recrystallized from methanol. M.P. 218–220° C., yield 3.4 g.

Elemental analysis ($C_{15}H_{19}O_4N_5S$)—Calc.: C, 49.31%; H; 5.24%; N, 19.19%. Found: C, 49.56%; H, 5.46%; N, 19.00%.

The solution of 3.4 g. of 2-methoxy-6-dimethylamino-4-acetylsulfanilamido-pyrimidine thus obtained in 30 cc. of 10% aqueous solution of sodium hydroxide was heated at 90° C. for one hour. After cooling acetic acid was added to the solution to deposite an oily substance which was crystallized on leaving alone. After filtration it was recrystallized from dilute methanol to give white scaly crystals of desired product. M.P. 207° C., yield 2.9 g.

Elemental analysis ($C_{13}H_{17}O_3N_5S$)—Calc.: C, 48.29%; H, 5.30%; N, 2.166%. Found: C, 48.02%; H, 5.42%; N, 21.51%.

EXAMPLE 2

2-ethoxy-6-dimethylamino-4-sulfanilamido-pyrimidine 1.82 g. (0.01 mol) of 2-ethoxy-6-dimethylamino-4-aminopyrimidine and 2.34 g. (0.01 mol) of p-acetamido-benzenesulfonylchloride were dissolved in 2.3 cc. of anhydrous pyridine and then subjected to the same reaction procedure as in Example 1. Recrystallization from methanol gave white needle crystals of 2-ethoxy-6-dimethylamino-4-acetylsulfanilamido-pyrimidine. M.P. 230–234° C., yield 3.5 g.

Elemental analysis ($C_{16}H_{21}O_4N_5S$)—Calc.: C, 50.65%; H, 5.58%; N, 18.46%. Found: C, 50.54%; H, 5.56%; N, 18.70%.

3.5 g. of 2-ethoxy-6-dimethylamino-4-acetylsulfanilamido-pyrimidine thus obtained were subjected to hydrolysis as in Example 1. Recrystallization from dilute methanol gave white scaly crystals of the desired product. M.P. 228–230° C., yield 2.9 g.

Elemental analysis ($C_{14}H_{19}O_3N_5S$)—Calc.: C, 49.84%; H, 5.68%; N, 20.76%. Found: C, 49.58%; H, 5.68%; N, 20.64%.

EXAMPLE 3

*2-n-propoxy-6-dimethylamino-4-sulfanilamido-pyrimidine*

1.96 g. (0.01 mol) of 2-n-propoxy-6-dimethyl-amino-4-amino-pyrimidine and 2.34 g. of p-acetamidobenzenesulfanylchloride were dissolved in 2.3 cc. of anhydrous pyridine and subjected to the same reaction procedure as in Example 1. Recrystallization from methanol gave light yellow columns of 2-n-propoxy-6-dimethylamino-4-acetylsulfanilamido-pyrimidine. M.P. 215–216° C., yield 3.7 g.

Elemental analysis ($C_{17}H_{23}O_4N_5S$)—Calc.: C, 51.90%; H, 5.89%; N, 17.80%. Found: C, 51.90%; H, 5.80%; N, 17.54%.

3.7 g. of 2-n-propoxy-6-dimethtylamino-4-acetylsulfanilamido-pyrimidine thus obtained were subjected to hydrolysis as in Example 1. Recrystallization from dilute methanol gave the desired white columns. M.P. 181–183° C., yield 3.1 g.

Elemental analysis ($C_{15}H_{21}O_3N_5S$)—Calc.: C, 51.27%; H, 6.02%; N, 19.93%. Found: C, 51.40%; H, 6.11%; N, 19.96%.

EXAMPLE 4

*2-i-propoxy-6-dimethylamino-4-sulfanilamido-pyrimidine*

1.96 g. (0.01 mol) of 2-i-propoxy-6-dimethylamino-4-amino-pyrimidine and 2.34 g. (0.01 mol) of p-acetamidobenzenesulfonylchloride were dissolved in 2.3 cc. of anhydrous pyridine and subjected to the same reaction procedure as in Example 1. Recrystallization from methanol gave 2-i-propoxy-6-dimethylamino-4-acetylsulfanilamido-pyrimidine. M.P. 186–188° C., yield 3.7 g.

Elemental analysis ($C_{17}H_{23}O_4N_5S$)—Calc.: C, 51.90%; H, 5.89%; N, 17.80%. Found: C, 51.82%; H, 5.60%; N, 18.05%.

3.7 g. of 2-i-propoxy-6-dimethylamino-4-acetylsulfanilamido-pyrimidine thus obtained were dissolved in a mixture of 10 cc. of concentrated hydrochloric acid and 100 cc. of methanol and caused to react at 100° C. for 5 hours. After completion of the reaction, the reaction product was adjusted to pH 6.0 to give deposits. Recrystallization from dilute methanol gave white scaly crystals of the desired product. M.P. 125–130° C., yield 3.2 g.

Elemental analysis ($C_{15}H_{21}O_3N_5S$)—Calc.: C, 51.27%; H, 6.02%; N, 19.93%. Found: C, 51.00%; H, 5.92%; N, 19.98%.

EXAMPLE 5

*6-dimethylamino-4-sulfanilamido-pyrimidine*

1.57 g. (0.01 mol) of 6-dimethylamino-4-chloropyrimidine, 3.44 g. (0.01 mol) of sulfanilamido, 2.76 g. (0.01 mol) of potassium carbonate and 0.75 g. (0.0126 mol) of sodium chloride were mixed well and heated with stirring on an oil bath. At the bath temperature of 135–140° C. and the internal temperature of 120° C. a violent reaction with bubbling was observed and the internal temperature raised to 150° C. The reaction was stopped in 4 minutes. The reaction product was dissolved in hot water and left to stand. The solids deposited were recovered by filtration and dissolved again in water. The solution was neutralized with 50% acetic acid. The precipitates thus formed were recovered by filtration and washed with water. Recrystallization from dilute methanol gave white scaly crystals of 6-dimethylamino-4-sulfanilamido-pyrimidine. M.P. 276° C., yield 1.9 g.

Elemental analysis ($C_{12}H_{15}O_2N_5S$)—Calc.: C, 49.14%; H, 5.16%; N, 23.88%. Found: C, 49.04%; H, 5.28%; N, 23.88%.

EXAMPLE 6

*2-dimethylamino-4-sulfanilamido-pyrimidine*

1.38 g. (0.01 mol) of 2-dimethylamino-4-amino-pyrimidine and 2.2 g. (0.01 mol) of p-nitro-benzenesulfonylchloride were dissolved in 2.2 cc. of anhydrous pyridine and left to stand at room temperature for one night. The reaction mixture was poured into 100 cc. of water. Recrystallization of the deposits formed from dilute methanol gave 2-dimethylamino-4-p-nitrobenzenesulfonamido-pyrimidine. M.P. 237° C., yield 3.2 g.

Elemental analysis ($C_{12}H_{13}O_4N_5S$)—Calc.: C, 40.29%; H, 3.38%; N, 19.59%. Found: C, 40.04%; H, 3.62%; N, 19.50%.

3.2 g. of 2-dimethylamino-4-p-nitrobenzenesulfonamido-pyrimidine thus obtained were dissolved in 100 cc. of methanol, and was reduced catalytically with 0.2 g. of palladium-carbon. The reaction product was filtered. The residue resulting from distillation of methanol under reduced pressure was dissolved in water and then neutralized with 10% aqueous solution of sodium hydroxide to give white crystals. Recrystallization from methanol gave white prism crystals of the desired product. M.P. 145° C.–147° C., yield 2.7 g.

Elemental analysis ($C_{12}H_{15}O_2N_5S$)—Calc.: C, 49.14%; H, 5.16%; N, 23.88%. Found: C, 49.47%; H, 5.31%; N, 23.43%.

EXAMPLE 7

*6-dimethylamino-4-sulfanilamido-pyrimidine*

1.38 g. (0.01 mol) of 6-dimethylamino-4-amino-pyrimidine and 2.34 g. (0.01 mol) of p-acetamidobenzenesulfonylchloride were dissolved in 2.3 cc. of anhydrous pyridine and subjected to the same reaction procedure as in Example 1. Recrystallization from methanol gave white needle crystals of 6-dimethylamino-4-acetylsulfanilamido-pyrimidine. M.P. 296–297° C., yield 3.2 g.

Elemental analysis ($C_{14}H_{17}O_3N_5S$)—Calc.: C, 50.14%; H, 5.11%; N, 20.89%. Found: C, 49.84%; H, 5.19%; N, 20.57%.

6-dimethylamino-4-acetylsulfanilamido-pyrimidine thus obtained was subjected to the hydrolysis as in Example 1. Recrystallization from dilute methanol gave the desired white scaly crystals. M.P. 276° C., yield 2.7 g.

From the results of elemental analysis, infrared spectrum and mixed examination, the present product was ascertained to be identical with that obtained in Example 5.

EXAMPLE 8

*2,6-bis-dimethylamino-4-sulfanilamido-pyrimidine*

An admixture of 2 g. (0.01 mol) of 2,6-bis-dimethylamino-4-chloro-pyrimidine and 4 g. (0.0206 mol) of sodium salt of sulfanilamide was added with 4 g. of acetamide at 60° C. under well stirring. After the reaction for 20 minutes at 75° C. the reaction product was added to 20 cc. of water and neutralized with concentrated hydrochloric acid to give deposits. The deposits were dissolved in 30 cc. of 10% aqueous solution of sodium hydroxide under heating and treated with activated carbon and then kept to stand in cool place, whereupon needle crystals of sodium salt of 2,6-bis-dimethylamino-4-sulfanilamido-pyrimidine deposited. Due to the influence of substitution of two dimethylamino radicals the present product is different from the usual sulfanilamides and dissolves with difficult at cold in caustic soda and caustic potash. Thus the product can be recrystallized in the form of sodium salt from the 10% aqueous solution. Said sodium salt, however, dissolves in water of pH 7.0. M.P. more than 300° C.

Sodium salt of 2.6-bis-dimethylamino-4-sulfanilamido pyrimidine thus obtained was dissolved in water and neutralized with acetic acid to give crystals. Recrystallization from methanol gave white needle crystals of the desired product. M.P. 223–224° C., yield 2.4 g.

Elemental analysis $(C_{14}H_{20}O_2N_6S)$—Calc.: C, 49.99%; H, 5.99%; N, 24.99%. Found: C, 49.73%; H, 5.98%; N, 24.60%.

EXAMPLE 9

*2.6-bis-dimethylamino-4-sulfanilamido-pyrimidine*

1.81 g. (0.01 mol) of 2.6-bis-dimethylamino-4-aminopyrimidine and 2.34 g. (0.01 mol) of p-acetamidobenzene-sulfonylchloride were dissolved in 2,3 cc. of anhydrous pyridine and subjected to the same reaction procedure as in Example 1. Recrystallization from methanol gave white needle crystals of 2.6-bis-dimethylamino-4-acetylsulfanilamido-pyrimidine. M.P. 235° C., yield 3.5 g.

Elemental analysis $(C_{16}H_{22}O_3N_6S)$—Calc.: C, 50.78%; H, 5.86%; N, 22.21%. Found: C, 50.40%; H, 5.72%; N, 22.57%.

3.5 g. of 2.6-bis-dimethylamino-4-acetylsulfanilamido-pyrimidine were dissolved in a mixed solution of 30 cc. of 10% sodium hydroxide solution and 30 cc. of methanol and caused to react at 70–80° C. for 3 hours on a water bath. The solution was kept to stand in cold place to deposit white needle crystals. Said crystals were recovered by filtration, dissolved in 30 cc. of water and neutralized with acetic acid to deposit crystals. Recrystallization from methanol gave white needle crystals of the desired product. M.P. 223–224° C., yield 2.6 g.

From the results of elemental analysis, infrared spectrum and mixed examination, the present product was ascertained to be identical with one obtained in Example 7.

EXAMPLE 10

*2-dimethylamino-6-chloro-4-sulfanilamido-pyrimidine*

1.72 g. (0.01 mol) of 2-dimethylamino-6-chloro-4-amino-pyrimidine and 2.2 g. (0.01 mol) of p-nitrobenzene-sulfonylchloride were dissolved in 2.2 cc. of anhydrous pyridine and left to stand at room temperature for one night. The reaction mixture was poured into 100 cc. of water. Recrystallization of the deposits formed from dilute methanol gave 2-dimethylamino-6-chloro-4-p - nitrobenzenesulfonamido - pyrimidine. M.P. 182–183° C., yield 3.4 g.

Elemental analysis $(C_{12}H_{12}O_4N_5SCl)$—Calc.: C, 40.29%; H, 3.38%; N, 19.59%. Found: C, 40.04%; H, 3.62%; N, 19.50%.

3.4 g. of 2-dimethylamino-6-chloro-4-p-nitrobenzenesulfonamido-pyrimidine thus obtained were dissolved in a mixture of 100 cc. of 95% ethanol and 10 cc. of concentrated hydrochloric acid. 100 g. of iron powder was added to the solution under heating and stirring. After the reaction for 14 hours under heating, the reaction product was filtered in hot state. The residue was washed several times with ethanol. From the mixture of the washed liquid and the mother liquid obtained previously, ethanol was distilled off under reduced pressure. The residue solidified. Recrystallization from dilute methanol gave white plate crystals of the desired product. M.P. 203–204° C., yield 2.9 g.

Elemental analysis $(C_{12}H_{14}O_2N_5SCl)$—Calc.: C, 43.97%; H, 4.31%; N, 21.33%. Found: C, 44.06%; H, 4.55%; N, 21.00%.

EXAMPLE 11

*2-dimethylamino-6-chloro-4-sulfanilamido-pyrimidine*

9.7 g. (0.05 mol) of dried sulfanilamide sodium salt and 8 g. (1.35 mol) of acetamide were heated to 160° C. Almost all sulfanilamide sodium salt dissolved. After cooling to 80–100° C., 6.4 g. (0.0183 mol) of monotrimethylammonium salt of 2-dimethylamino-4.6-dichloro-pyrimidine were added under stirring, whereupon trimethylamine evolved. For completion of the evolution, the mixture was heated for a short time. The residue resulting from distillation of acetamide at 180° C. under reduced pressure was added with 40 cc. of water to completely dissolve. When the solution was left to stand in ice room for a long time the raw material sulfanilamide deposited. After removal of the deposits by filtration, the mother liquid was adjusted to pH 6.0 with concentrated hydrochloric acid to give the desired crude product of M.P. 200° C. Recrystallization of the product from dilute methanol gave white plate crystals of the desired product. M.P. 203–204° C., yield 4.25 g.

From the results of elemental analysis, infrared spectrum and mixed examination, the present product was ascertained to be identical with one obtained in Example 9.

Elemental analysis $(C_{12}H_{14}O_2N_5SCl)$—Calc.: C, 43.97%; H, 4.33%; N, 21.33%. Found: C, 44.10%; H, 4.18%; N, 21.63%.

EXAMPLE 12

*2-dimethylamino-6-chloro-4-sulfanilamido-pyrimidine*

1.72 g. (0.01 mol) of 2-dimethylamino-6-chloro-4-aminopyrimidine and 2.34 g. (0.01 mol) of p-acetamidobenzene-sulfonylchloride were dissolved in 2.3 cc. of anhydrous pyridine and subjected to the same reaction procedure as in Example 1. Recrystallization from methanol gave 2 - dimethylamino-6-chloro-4-acetylsulfanilamido-pyrimidine. M.P. 216° C., yield 3.5 g.

3.5 g. of 2-dimethylamino-6-chloro-4-acetylsulfanilamido-pyrimidine thus obtained were subjected to hydrolysis as in Example 1. Recrystallization from dilute methanol gave the desired product. Yield 3.1 g.

From the results of elemental analysis, infrared spectrum and mixed examination, the present product was ascertained to be identical with those obtained in Examples 9 and 10.

EXAMPLE 13

*2-diethylamino-6-chloro-4-sulfanilamido-pyrimidine*

2 g. (0.01 mol) of 2-diethylamino-6-chloro-4-aminopyrimidine and 2.34 g. (0.01 mol) of p-acetamidobenzenesulfonylchloride were dissolved in 2.3 cc. of anhydrous pyridine and subjected to the same reaction procedure as in Example 1. Recrystallization from methanol gave 2-diethylamino-6-chloro-4-acetylsulfanilamido-pyrimidine. M.P. 194° C., yield 3.8 g.

Elemental analysis $(C_{16}H_{20}O_3N_5SCl)$—Calc.: C, 48.30%; H, 5.07%; N, 17.61%. Found: C, 48.40%; H, 5.02%; N, 18.05%.

3.8 g. of 2-diethylamino-6-chloro-4-acetylsulfanilamido-pyrimidine thus obtained were subjected to hydrolysis by usual way. The hydrolysis can be easily carried out by caustic soda but it may be also performed even by 20% hydrochloric acid solution. Recrystallization from dilute methanol gave white plate crystals of the desired product. M.P. 164° C., yield 3.4 g.

Elemental analysis $(C_{14}H_{18}O_2N_5SCl)$—Calc.: C, 47.26%; H, 5.10%; N, 19.67%. Found: C, 47.60%; H, 5.28%; N, 19.68%.

EXAMPLE 14

*2-dimethylamino-6-methoxy-4-sulfanilamido-pyrimidine*

1.68 g. (0.01 mol) of 2-dimethylamino-6-methoxy-4-amino-pyrimidine and 2.34 g. (0.01 mol) of p-acetamidobenzenesulfonylchloride were dissolved in 2.3 cc. of anhydrous pyridine and subjected to the same reaction procedure as in Example 1. Recrystallization from methanol gave white column crystals of 2-dimethylamino-6-methoxy-4-acetylsulfanilamido-pyrimidine. M.P. 251° C., yield 3.5 g.

Elemental analysis $(C_{15}H_{19}O_4N_5S)$—Calc.: C, 49.31%;

H, 5.24%; N, 19.19%. Found: C, 49.52%; H, 5.48%; N, 19.20%.

3.5 g. of 2-dimethylamino-6-methoxy-4-acetylsulfanilamido-pyrimidine thus obtained were subjected to hydrolysis as in Example 1. Recrystallization from dilute methanol gave white plate crystals of the desired product. M.P. 220° C., yield 3 g.

Elemental analysis ($C_{13}H_{17}O_3N_5S$)—Cal.: C, 48.29%; H, 5.30%; N, 21.66%. Found: C, 48.11%; H, 5.20%; N, 21.26%.

The mixed examination of the present product with the product obtained in Example 1 showed clearly the depression of melting point, so that the present product was an isomer having different substituted position.

EXAMPLE 15

*2-dimethylamino-6-ethoxy-4-sulfanilamido-pyrimidine*

1.82 g. (0.01 mol) of 2-dimethylamino-6-ethoxy-4-aminopyrimidine and 2.34 g. (0.01 mol) of p-acetamidobenzenesulfonylchloride were dissolved in 2.3 cc. of anhydrous pyridine and subjected to the same reaction procedure as in Example 1. Recrystallization from diluted methanol gave white needle crystals of 2-dimethylamino-6-ethoxy-4 - acetylsulfanilamido-pyrimidine. M.P. 223–224° C., yield 3.6 g.

Elemental analysis ($C_{16}H_{21}O_4N_5S$) — Calc.: C, 50.65%; H, 5.58%; N, 18.46%. Found: C, 50.45%; H, 5.70%; N, 18.17%.

3.6 g. of 2-dimethylamino-6-ethoxy-4 - acetylsulfanilamido-pyrimidine thus obtained were subjected to hydrolysis by usual way. Recrystallization from dilute methanol gave white plate crystals of the desired product. M.P. 186° C., yield 3.1 g.

Elemental analysis ($C_{14}H_{19}O_3N_5S$) — Calc.: C, 49.84%; H, 5.68%; N, 20.76%. Found: C, 49.62%; H, 5.68%; N, 20.90%.

EXAMPLE 16

*2-dimethylamino-6-n-propoxy-4-sulfanilamido-pyrimidine*

1.96 g. (0.01 mol) of 2-dimethylamino-6-n-propoxy-4-aminopyrimidine and 2.34 g. (0.01 mol) of p-acetamidobenzenesulfonylchloride were dissolved in 2.3 cc. of anhydrous pyridine and subjected to the same reaction procedure as in Example 1. Recrystallization from dilute methanol gave light yellow plate crystals of 2-dimethylamino-6-n-propoxy-4 - acetylsulfanilamido pyrimidine. M.P. 162° C., yield 3.5 g.

Elemental analysis ($C_{17}H_{23}O_4N_5S$) — Calc.: C, 51.90%; H, 5.89; N, 17.80%. Found: C, 51.67%; H, 6.21%; N, 18.11%.

3.5 g. of 2 - dimethylamino - 6-n-propoxy-4-acetylsulsulfanilamido-pyrimidine thus obtained were subjected to hydrolysis by usual way. Recrystallization from dilute methanol gave white plate crystals of the desired product. M.P. 91° C., yield 3 g.

Elemental analysis ($C_{15}H_{21}O_3N_5S$) — Calc.: C, 51.27%; H, 6.02%; N, 19.93%. Found: C, 51.05%; H, 6.14%; N, 20.10%.

EXAMPLE 17

*2-dimethylamino-6-ethylthio-4-sulfanilamido-pyrimidine*

1.89 g. (0.01 mol) of 2-dimethylamino-6-ethylthio-4-amino-pyrimidine and 2.34 g. (0.01 mol) of p-acetamidobenzenesulfonylchloride were dissolved in 2.3 cc. of anhydrous pyridine and subjected to the same reaction procedure as in Example 1. Recrystallization from dilute methanol gave 2-dimethylamino-6-ethylthio-4 - acetylsulfanilamido-pyrimidine. M.P. 225–226° C., yield 3.6 g.

Elemental analysis ($C_{16}H_{21}O_3N_5S_2$) — Calc.: C, 48.60%; H, 5.35%; N, 17.72%. Found: C, 48.97%; H, 5.46%; N, 17.79%.

3.6 g. of 2 - dimethylamino - 6 - ethylthio - 4 - acetyl-sulfanilamido-pyrimidine thus obtained were subjected to hydrolysis by usual way. Recrystallization from dilute methanol gave white plate crystals of the desired product. M.P. 139° C., yield 3.1 g.

Elemental analysis ($C_{14}H_{19}O_2N_5S$) — Calc.: C, 47.59%; H, 5.42%; N, 19.82%. Found: C, 47.45%; H, 5.58%; N, 19.75%.

EXAMPLE 18

*2-dimethylamino-6-n-propylthio-4-sulfanilamido-pyrimidine*

2.12 g. (0.01 mol) of 2-dimethylamino-6 - n-propylthio-4-amino-pyrimidine and 2.34 g. (0.01 mol) of p-acetamidobenzenesulfonylchloride were dissolved in 2.3 cc. of anhydrous pyridine and subjected to the same reaction procedure as in Example 1. Recrystallization from dilute methanol gave white column crystals of 2-dimethylamino-6-n-propylthio - 4 - acetylsulfanilamido-pyrimidine. M.P. 205° C., yield 3.8 g.

Elemental analysis ($C_{17}H_{23}O_3N_5S_2$) — Calc.: C, 49.87%; H, 5.66%; N, 17.11%. Found: C, 50.06%; H, 5.73%; N, 16.96%.

3.8 g. of 2-dimethylamino-6-n-propylthio-4 - acetylsulfanilamido-pyrimidine thus obtained were dissolved in 40 cc. of 10% aqueous solution of sodium hydroxide and heated at 90–100° C. for 2 hours. On acidification with acetic acid crystals deposited. Recrystallization from dilute methanol gave the desired product. M.P. 167° C., yield 3.2 g.

Elemental analysis ($C_{15}H_{21}O_2N_5S_5$) — Calc.: C, 49.04%; H, 5.76%; N, 19.07%. Found: C, 49.42%; H, 5.97%; N, 18.86%.

EXAMPLE 19

*2-dimethylamino-6-i-propylthio-4-sulfanilamido-pyrimidine*

2.12 g. (0.01 mol) of 2-dimethylamino-6-i-propylthio-4-amino-pyrimidine and 2.3 g. (0.01 mol) of p-acetamidobenzenesulfonylchloride were dissolved in 2.3 cc. of anhydrous pyridine and subjected to the same reaction procedure as in Example 1. Recrystallization from dilute methanol gave 2 - dimethylamino - 6 - i-propylthio-4-acetylsulfanilamido pyrimidine. M.P. 182° C., yield 3.9 g.

Elemental analysis ($C_{17}H_{23}O_3N_5S_2$)—Calc.: C, 49.87%; H, 5.66%; N, 17.11%. Found: C, 49.95%; H, 5.51%; N, 17.33%.

3.9 g. of 2 - dimethylamino - 6 - i - propylthio - 4 - acetyl-sulfanilamido-pyrimidine thus obtained were subjected to hydrolysis by usual way. Recrystallization from dilute methanol gave white plate crystals of the desired product. M.P. 171° C., yield 3.3 g.

Elemental analysis ($C_{15}H_{21}O_2N_5S_5$)—Calc.; C, 49.04%; H, 5.76%; N, 19.07%. Found: C, 49.58%; H, 5.98%; N, 19.05%.

EXAMPLE 20

*2 - methylthio - 6 - dimethylamino - 4-sulfanilamido-pyrimidine*

1.84 g. (0.01 mol.) of 2-methylthio-6-dimethylamino-4-aminopyrimidine and 2.34 g. (0.01 mol.) of p-acetamidobenzenesulfonylchloride were dissolved in 2.3 cc. of anhydrous pyridine and subjected to the same reaction procedure as in Example 1. Recrystallization from methanol gave 2-methylthio-6-dimethylamino-4-acetylsulfanilamido-pyrimidine. Yield 3.1 g.

3.1 g. of 2-methylthio-6-dimethylamino-4-acetylsulfanilamido-pyrimidine thus obtained were dissolved in a mixture of 40 cc. of 10% aqueous solution of sodium hydroxide and 10 cc. of methanol and subjected to reflux on a water bath at 80–90° C. for 4 hours. Neutralization with acetic acid after cooling gave deposits. Recrystallization from methanol gave light yellow fine needle crystals of the desired product. M.P. 242–243° C., yield 2.9 g.

Elemental analysis ($C_{13}H_{17}O_2N_5S_2$)—Calc.: C, 46.01%; H, 5.05%; N, 20.64%. Found: C, 46.22%; H, 5.40%; N, 20.62%.

EXAMPLE 21

*2-pyrrolidino-6-chloro-4-sulfanilamido-pyrimidine*

1.98 g. (0.01 mol) of 2-pyrrolidino-6-chloro-4-aminopyrimidine and 2.34 g. (0.01 mol) of p-acetamidobenzenesulfonylchloride were dissolved in 2.3 cc. of anhydrous pyridine and subjected to the same reaction procedure as in Example 1. Recrystallization from dilute methanol gave light yellow scaly crystals of 2-pyrrolidino-6-chloro-4-acetylsulfanilamido-pyrimidine. M.P. 241° C., yield 3.6 g.

3.6 g. of 2-pyrrolidino-6-chloro-4-acetylsulfanilamido-pyrimidine thus obtained were dissolved in a mixture of 40 cc. of 10% aqueous solution of sodium hydroxide and 100 cc. of methanol and heated on a water bath at 80–90° C. for 4 hours. On cooling, sodium salt of 2-pyrrolidino-6-chloro-4-sulfanilamido-pyrimidine was deposited in a form of needle crystals. M.P. over 300° C. The crystals recovered by filtration were dissolved in 300 cc. of water and adjusted to pH 6.0 with acetic acid to give 3.1 g. of free 2-pyrrolidino-6-chloro-4-sulfanilamido-pyrimidine.. Recrystallization from a mixed solvent of acetone and water gave white needle crystals of the desired product. M.P. 234° C., yield 2.8 g.

Elemental analysis ($C_{14}H_{16}O_2N_5SCl$)—Calc.: C, 47.53%; H, 4.55%; N, 19.80%. Found: C, 47.55%; H, 4.38%; N, 19.81%.

EXAMPLE 22

*2-diallylamino-6-chloro-4-sulfanilamido-pyrimidine*

2.24 g. (0.01 mol) of 2-diallylamino-6-chloro-4-aminopyrimidine and 2.34 g. (0.01 mol) of p-acetamidobenzenesulfonylchloride were dissolved in 2.3 cc. of anhydrous pyridine and subjected to the same reaction procedure as in Example 1. Recrystallization from dilute alcohol gave white scaly crystals of 2-diallylamino-6-chloro-4-acetylsulfanilamido-pyrimidine. M.P. 183–185° C., yield 3.8 g.

3.8 g. of 2-diallylamino-6-chloro-4-acetylsulfanilamido-pyrimidine thus obtained were subjected to hydrolysis with methanolic caustic soda. Recrystallization from methanol gave the desired crystal. M.P. 172–173° C., yield 3.3 g.

Elemental analysis ($C_{16}H_{18}O_2N_5SCl$)—Calc.: C, 50.59%; H, 4.77%; N, 18.44%. Found: C, 50.55%; H, 4.56%; N, 18.42%.

EXAMPLE 23

*2-morpholino-6-chloro-4-sulfanilamido-pyrimidine*

2.15 g. (0.01 mol) of 2-morpholino-6-chloro-4-aminopyrimidine and 2.34 g. (0.01 mol) of p-acetamidobenzenesulfonylchloride were dissolved in 2.3 cc. of anhydrous pyridine and subjected to the same reaction procedure as in Example 1. Recrystallization from methanol gave white needle crystals of 2-morpholino-6-chloro-4-acetylsulfanilamido-pyrimidine. M.P. 274° C., yield 3.8 g.

Elemental analysis ($C_{16}H_{18}O_4N_5SCl$)—Calc.: C, 46.66%; H, 4.40%; N, 17.00%. Found: C, 46.62%; H, 4.47%; N, 17.21%.

3.8 g. of 2-morpholino-6-chloro-4-acetylsulfanilamido-pyrimidine thus obtained were subjected to hydrolysis as in Example 1. Recrystallization from dilute methanol gave white scaly crystals of the desired product. M.P. 271° C., yield 3.4 g.

Elemental analysis ($C_{14}H_{16}O_3N_5SCl$)—Calc.: C, 45.46%; H, 4.36%; N, 18.94%. Found: C, 45.43%; H, 4.29%; N, 19.03%.

What we claim is:

1. 2-dimethylamino-6-chloro-4-sulfanilamido-pyrimidine.
2. 2-diethylamino-6-chloro-4-sulfanilamido-pyrimidine.
3. 2-pyrrolidino-6-chloro-4-sulfanilamido-pyrimidine.
4. 2-diallylamino-6-chloro-4-sulfanilamido-pyrimidine.
5. 2-morpholino-6-chloro-4-sulfanilamido-pyrimidine.
6. A compound selected from the group consisting of a compound of the formula

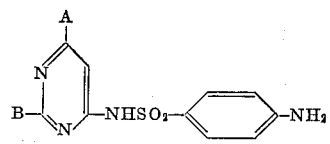

and the pharmaceutically acceptable alkali metal and acid-addition salts thereof wherein A is halogen and B is selected from the group consisting of di (lower alkyl) amino, di (lower alkenyl) amino, pyrrolidino and morpholino.

References Cited

UNITED STATES PATENTS 2,494,524    1/1950    Sprague _____ 260—239.75 X

OTHER REFERENCES

Bretschneider et al.: Monatsh. Chem., vol 92, pages 75–78 (1961).

Chemical Abstracts I, vol. 45, cols. 2894–5 (1951).

Chemical Abstracts II, 1947–1956, Decennial Index, p. 12156s (July 1962).

Chemical Abstracts III, vol. 58, cols. 5680–1 (March 1963).

JOHN D. RANDOLPH, *Primary Examiner.*